United States Patent [19]

Cooper, Jr.

[11] 3,718,874

[45] Feb. 27, 1973

[54] ETCHED INDUCTANCE BANDPASS FILTER

[75] Inventor: Robert B. Cooper, Jr., Oklahoma City, Okla.

[73] Assignee: Edwin J. Sossen, Oklahoma City, Okla., a part interest

[22] Filed: Dec. 29, 1970

[21] Appl. No.: 102,450

[52] U.S. Cl.....................................333/73 S, 336/200

[51] Int. Cl..........H01p 1/20, H01p 3/08, H03h 7/14

[58] Field of Search...333/75, 76, 84 M, 29, 30, 73 S

[56] References Cited

UNITED STATES PATENTS

| | | | |
|---|---|---|---|
| 1,647,474 | 11/1927 | Seymour | 343/700 A |
| 2,811,698 | 10/1957 | Slate | 333/84 M |
| 2,751,558 | 6/1956 | Grieg et al. | 333/84 M |
| 3,436,687 | 4/1969 | Andrews | 333/29 |
| 3,585,534 | 6/1971 | Senf | 333/29 |
| 2,694,150 | 11/1954 | Brussard | 333/82 A |
| 3,022,472 | 2/1962 | Tannenbaum | 333/18 |

OTHER PUBLICATIONS

Geffee: Simplified Modern Filter Design (Rider, New York) 1963 page 47.
Sturley: Radio Receiver Design, Part I (Wiley, New York) 1953, page 252.

*Primary Examiner*—Herman Karl Saalbach
*Attorney*—Oblon, Fisher & Spivak

[57] ABSTRACT

A bandpass filter of one or more stages using etched inductors and designed for use in the VHF or UHF ranges is disclosed. Three etched inductors are used in each stage, and a variable capacitor is used to tune the stage. Alternatively, the variable capacitor may be replaced by a fixed capacitor, and a variable inductor may be substituted for one of the fixed inductors. Coaxial cable may be used to couple stages together. A modified filter stage is also disclosed to simplify tuning procedures when filters having three cascaded stages are assembled.

13 Claims, 5 Drawing Figures

INVENTOR
ROBERT B. COOPER
JR.
Sloq, Tiffert & Spivak
ATTORNEYS

INVENTOR
ROBERT B. COOPER, JR.

BY Ostroy, Fisher & Spivak
ATTORNEYS

ETCHED INDUCTANCE BANDPASS FILTER

BACKGROUND OF THE INVENTION

This invention relates generally to filtering circuitry, and more particularly to bandpass filtering circuitry using etched inductances.

Since the early part of the twentieth century, when radio frequency communications devices were first developed, problems have existed with respect to overcrowding of certain portions of the radio spectrum due to the number of radio transmitters in use. More recently, due to the limited capacity of the lower frequency bands, attention has been increasingly directed to the use of very high frequency (VHF) and ultra high frequency (UHF) portions of the radio spectrum. However, at the present time, a tremendous increase in the use of radio frequency communications systems has resulted in an astonishing growth in the use of the UHF and VHF frequency bands, causing overcrowding of even these portions of the radio spectrum. More specifically, the increased demands of public service agencies, the needs of the public to be informed through television and FM broadcasts, the requirements of the military, and the needs of hundreds of others for radio communications have compounded existing spectrum crowding problems by forcing ever-increasing numbers of transmissions into a limited, non-expandible radio spectrum.

From a technical point of view, one of the serious problems created by overcrowding of the radio spectrum is that out of band interference caused by transmissions at frequencies different from, but near to, a frequency on which desired information is to be received. Such out of band interference can distort or completely mask the desired information broadcast, causing serious inconvenience in most cases.

The problem of out of band interference has created a need for an efficient, low-cost filtering system, useful especially in the UHF and VHF ranges, which can be added to the ever-increasing number of transmitters and receivers being manufactured to enhance their frequency selectivity.

A variety of attempts have been made in the past, of course, to satisfy this need for such filtering circuits. However, the prior art in this field has consisted essentially of various types of filtering circuits constructed of conventional air or coil wound inductances. While such filters were theoretically operable in the UHF and VHF ranges, they were in fact extremely sensitive to changes in ambient temperature and humidity conditions, making them extremely unstable and therefore nearly useless. In addition, the filters constructed of conventional coils had to be very carefully tuned, requiring the use of elaborate electronic test equipment and the skill of electronic engineers, and were therefore very expensive to build and install. Because of their sensitivity to temperature and humidity variations, their high cost, and the labor required to tune such circuits, thy have not been used in mass produced radio and television equipment operating in the UHF and VHF ranges. Consequently, even though the need for high quality filtering systems is well known and is increasing daily, they have not been used except in the most expensive and sophisticated communications systems.

Even where expensive bandpass filtering circuits are used, when they are constructed of conventional coil wound inductances, they still include a number of inefficiencies and technical defects. For example, multiple stage bandpass filters using coil inductors require shielding between the various stages because of the ever present problem of stray inductance generated by the coil inductors. In addition, the geometrical configuration and physical size of conventional coil wound inductors makes them inherently inefficient to use and causes them to exhibit relatively poor frequency selectivity. Additional selectivity, of course, can be achieved by cascading additional stages. However, cascading stages causes substantial attenuation of frequencies in the desired pass band, especially when conventional coil type inductors are used.

SUMMARY OF THE INVENTION

Accordingly, one object of this invention is to provide a new bandpass filter network that is highly selective, yet inexpensive to manufacture.

Another object of this invention is to provide a novel band-pass filter that is relatively insensitive to changes in ambient temperature and humidity.

A further object of this invention is the provision of a multiple stage bandpass filter that is highly selective, yet inexpensive to manufacture and easily tunable.

Yet another object of this invention is the provision of an improved bandpass filter that is highly selective, yet present excessive attenuation within the desired pass band.

A still further object of the instant invention is to provide an improved bandpass filter network that inhibits stray inductance between stages.

Briefly, these and other objects of the invention are achieved by constructing parallel tuned bandpass filter stages using etched inductances. Variable capacitors are included in the filter stages so that they can be easily adjusted to a desired center frequency. Stages may be cascaded using appropriate interstage coupling techniques to produce a more highly selective filter network.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings, wherein.

DESCRIPTION OF THE PREFERRED EMBODIMENT

Figure 1:
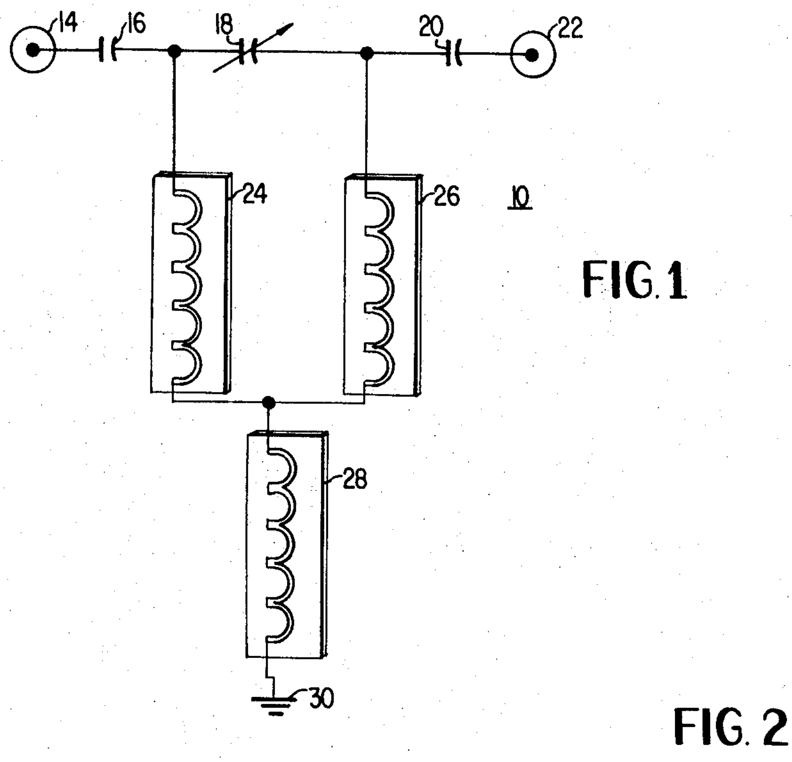
FIG. 1 is a schematic diagram representing a single stage bandpass filter circuit constructed in accordance with the teachings of the instant invention.

Referring now to the drawings, wherein like reference numerals designate identical or corresponding parts throughout the several views, and more particularly to FIG. 1 thereof, a single bandpass filter stage designated generally by the numeral 10 is shown. Filter stage 10 includes an input coupler 14 which is connected to one terminal of a coupling capacitor 16. The other terminal of coupling capacitor 16 is connected to a trimming capacitor 18 which, in turn, is connected to a second coupling capacitor 20, to which an output coupler 22 is connected. Input coupling capacitor 16 is selected to match the impedance of filter stage 10 to the input circuitry, which may be a receiving antenna system, for example. Output coupling capacitor 20 is selected to match the impedance of stage 10 to the output circuitry, when may be, for example, an additional filter stage or the first active stage of a radio receiver. These capacitor values also determine the overall band width of bandpass filter 10. Thus, by selecting the proper value of capacitors 16 and 20, it is possible to select the maximum band width which the filter stage 10 will transmit. Typically, this band width can be varied from less than 1 percent of the center frequency of the filter to as much as 20 percent of the center frequency, without introducing undesirable characteristics into the filter's bandpass characteristics. Trimming capacitor 18 is shown as a variable capacitor, although it may also be a fixed capacitor as will be described hereinafter. If capacitor 18 is selected to be a variable capacitor, it may be used to adjust the bandpass selectivity of filter stage 10. For example, by adjusting capacitor 18, it is possible to vary the width or sharpness of the pass band of the stage over a suitable range of values.

Coupled to the juncture of capacitors 16 and 18 is first etched inductor 24. A second etched inductor 26 is coupled to one end of first etched inductor 24 as well as to the juncture of capacitors 18 and 20. A third inductor 28 is coupled between the juncture of inductors 24 and 26 and ground 30.

Inductors 24 and 26 are both of identical fixed values. They are etched inductors, may be manufactured according to any of the conventional printed circuit etching techniques, and may have physical configurations similar to those illustrated in FIGS. 4 or 5, for example. However, as etched inductors, they possess a number of practical advantages exclusive to etched inductors. For example, once a master etching is made, exact duplication of the master can be achieved very simply. Thus, mass production of identical inductors is possible using etched inductor techniques. This is an important advantage, since it allows the building of perfectly balanced circuits which are extremely easy to tune. In addition, it allows mass production of circuits having components which are virtually identical, and which are therefore nearly identical to tune. As is well known to those skilled in the art, this is in marked contrast with filter circuits using conventional coil wound inductors, because generally no two conventional inductors are identical. Thus, building perfectly balanced circuits using coil wound inductors is extremely difficult, and no two such circuits can be tuned in the same manner.

Inductors 24 and 26 are selected to have inductance values that are determined by the lowest frequency at which the filter stage 10 will be used. It is known, of course, that the maximum frequency that will be passed to filter stage 10 is approximately twice the known lowest frequency.

Inductor 28 may be either an etched inductor or a coil wound inductor, although in the preferred embodiment of the invention illustrated in FIG. 1, it is chosen as an etched inductor. In this case, inductor 28 has a fixed value and trimming capacitor 18 is chosen to be a variable capacitor, providing the only adjustable parameter in the circuit. However, if inductor 28 is chosen to be a conventional coil type inductor, it may be adjustable, in which case capacitor 18 may be fixed and coil 28 would provide the only adjustable parameter in the circuit. Whether inductor 28 is a conventional coil wound inductor or an etched inductor, it is chosen to have a value of inductance representative of a particular frequency region, but of course the selected inductance value may be varied in the design of the filter 10 to enable it to respond over different frequency ranges.

Figure 2:
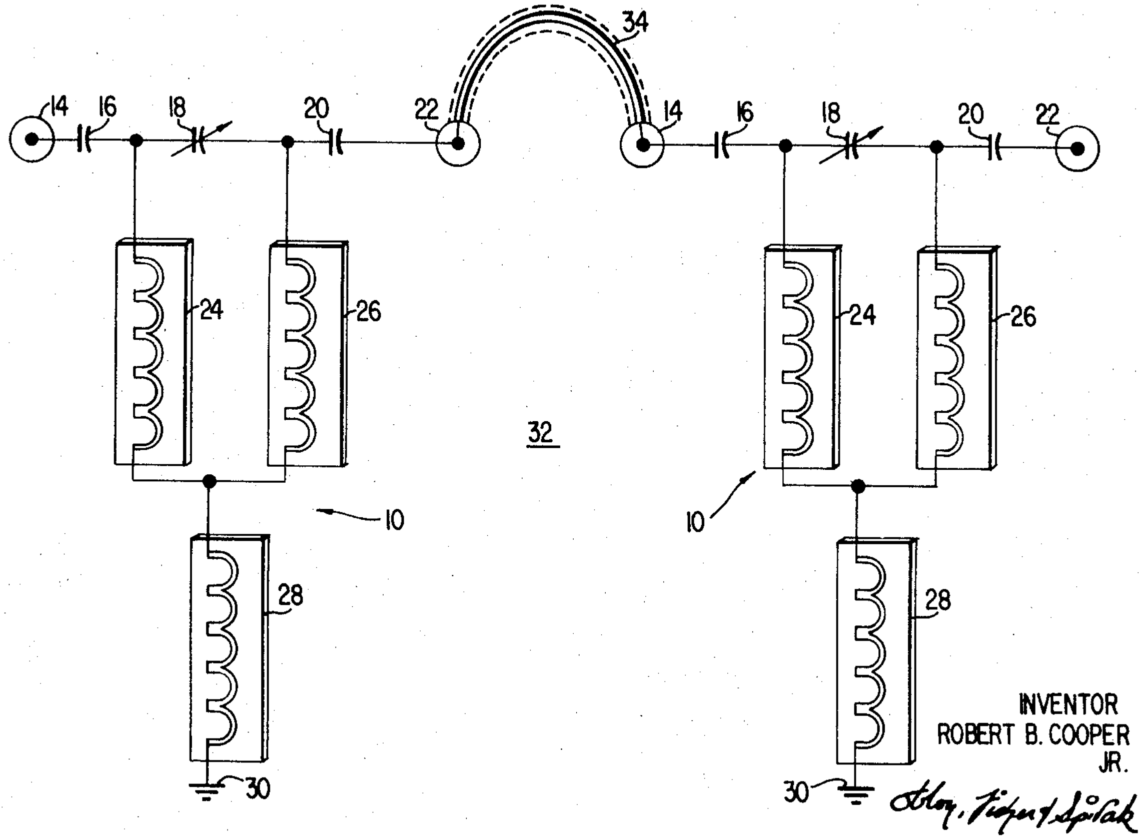
FIG. 2 is a schematic diagram illustrating a two stage bandpass filter circuit constructed in accordance with the teachings of the instant invention.

Referring now to FIG. 2, there is shown a two stage bandpass filter circuit designated generally as 32. Two stage circuit 32 includes two identical filter stages 10 coupled together by means of a short length of non-resonant, low-impedance coaxial cable 34. The use of the coaxial cable segment 34 as for interconnecting cascaded stages 10 is important in that it eliminates problems caused in some prior art filter designs where capacitive coupling was used between identical stages. More specifically, simple capacitive coupling can cause stray resonances to occur, resulting in the coupling capacitor acting as a capacitive load on both of the circuits which it interconnects. The use of coaxial cable in short lengths having non-resonant low-impedance properties has been found to eliminate this problem.

Several variations of circuits 32 are possible in light of the alternative configurations of circuit 10 described hereinbefore. For example, in either of circuits 10, trimming capacitors 18 may be fixed value capacitors and inductors 28 may be variable coil type inductors. Alternatively, capacitors 18 may both be variable and inductors 28 may both be fixed value etched inductors.

The advantage of cascading stages in a filter circuit such as 32 is, of course, to improve the frequency selectivity of the overall cascaded circuit. However, with the use of etched inductor elements, cascading stages produces a result that is substantially better than would be expected with cascaded filter stages using conventional wire wound inductors. For example, while the selectivity of cascaded filter circuit 32 is high, attenuation in the desired frequency band is lower than would be expected with conventional circuits due to the high efficiency of the etched inductor circuitry; that is, the precision of the etched inductors and their ability to be manufactured to extremely fine tolerances permits each of the filter stages to be highly selective while exhibiting low losses. Because of the greater selectivity of etched inductor filters, fewer stages are required to achieve desired results than would be necessary if conventional inductors were used. In addition, because of the fact that stray inductance between stages may be virtually eliminated by properly selecting the patterns of the etched inductors, cascaded circuits can be manufactured without need for shielding between stages. Thus, cascaded filters using etched inductors are substantially more efficient than conventional filter circuits using wire wound inductors and can be constructed at considerably lower cost.

Figure 3:
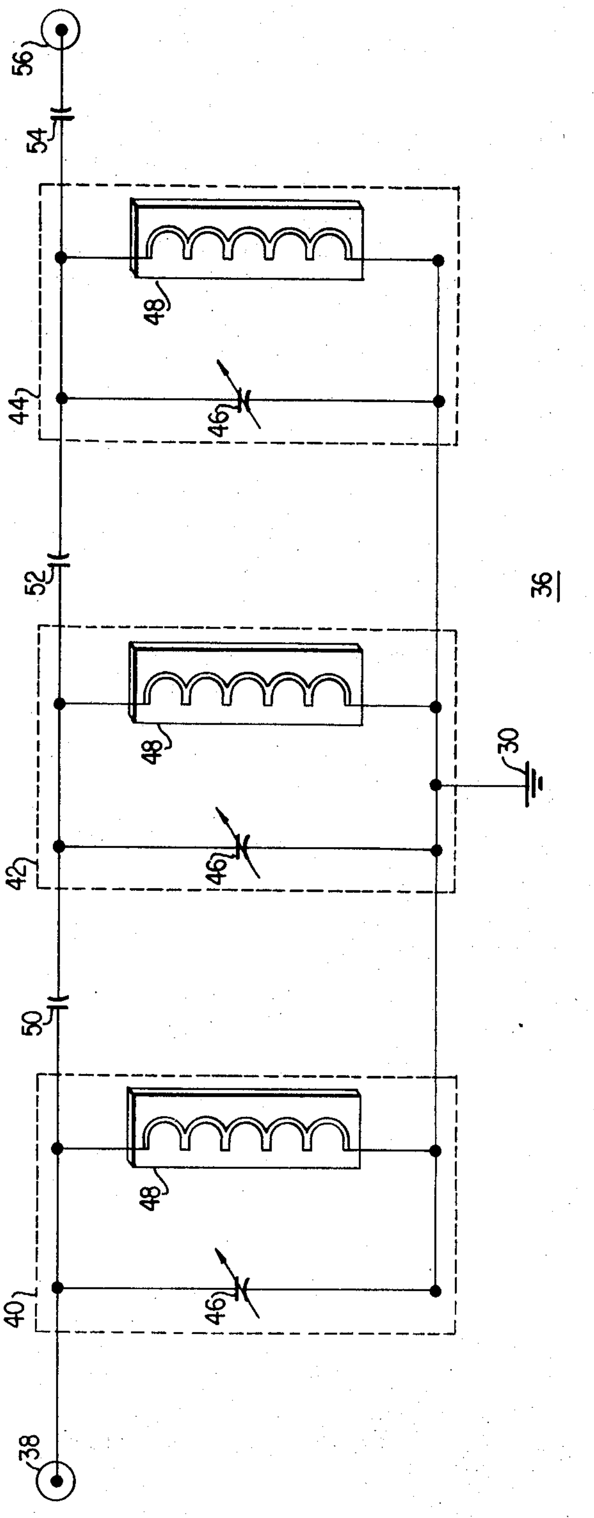
FIG. 3 is a schematic diagram illustrating a modified bandpass filter stage.

The cascaded filter circuit 32 of FIG. 2 is essentially a perfectly balanced circuit, since each of its stages are identical. Because of this fact, circuit 32 is extremely simple to tune to a particular frequency. However, once a third stage is added, the balance of the circuit is destroyed. Thus, although it is possible to add a third stage, identical to circuits 10, and to thereby make a highly selective three stage cascaded filter, tuning of such a circuit would be somewhat more difficult due to its unbalanced nature. To simplify the problem of tuning a three stage filter, a modified filter stage 36 was developed, as illustrated in FIG. 3. Modified filter stage 36 includes an input coupling 38 which may be connected directly to the output coupling 22 of circuit 32 if stage 36 is to be cascaded with circuit 32.

Filter stage 36 consists of three cooperating substages 40, 42, and 44, each of which includes a variable capacitor 46 coupled in parallel to an etched inductor 48. First and second substages 40 and 42 are coupled to one another by means of a coupling capacitor 50. Likewise, second substage 42 is coupled to third substage 44 by a second coupling capacitor 52. A third coupling capacitor 54 couples third substage 44 to an output connector 56 which may be coupled to yet another filter stage or to the first active stage of a radio receiver, for example.

As is clear from the drawing, each of substages 40, 42, and 44 are separately tunable by means of variable capacitors 46. This is necessary since each of the three substages performs a separate function. First substage 40 is an impedance matching section which has the effect of isolating the circuit connected to input coupling 38 from the remainder of circuit 36. As such, once properly tuned, it permits the remaining substages 42 and 44 to be tuned without influencing the state of tune of the input circuitry. It also eliminates the need for a coaxial cable coupling 34 as shown in FIG. 2 between second stage and sub-stage 40.

Second substage 42 provides a manner of adjusting attenuation in the pass band of filter stage 36. Generally, capacitor 46 in substage 42 is tuned to minimize the attenuation of stage 36.

Third substage 44 acts as a linearity control in that it adjusts the flatness of the pass band of filter stage 36. Normally, capacitor 46 of this substage is tuned to maximize the linearity of the filter stage.

It will be observed that filter stage 36 employs etched inductances and therefore includes the advantages of improved selectivity, low manufacturing costs, and freedom from spurious interstage coupling.

It will also be observed that it is not necessary to use circuit 36 only as a stage in a cascaded filter network of stages 10. Circuit 36 may also be used above as a filter, or it may be coupled to identical circuits to form a cascaded filter comprised entirely of stages 36.

Figure 4:
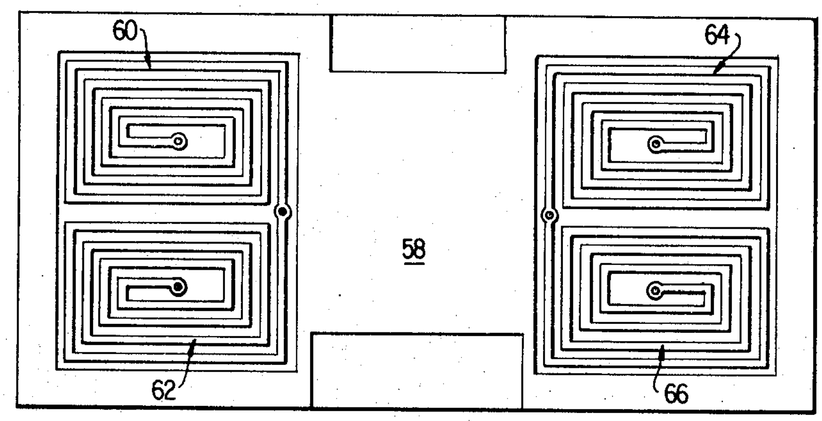
FIG. 4 is an illustration of an etched inductance board.
Figure 5:
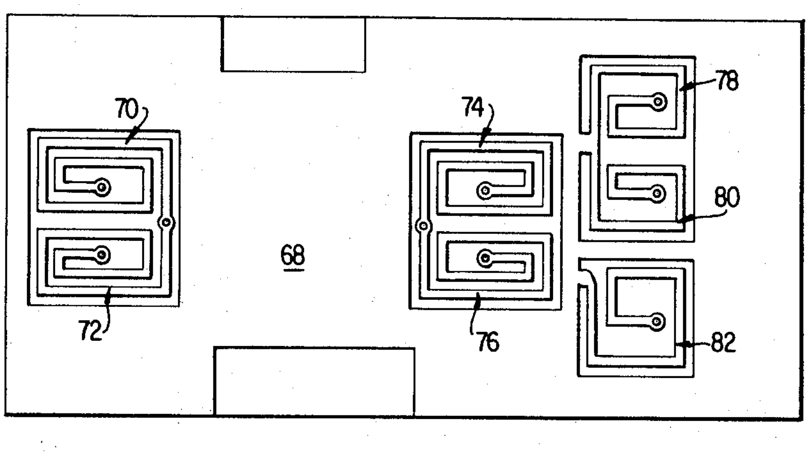
FIG. 5 is an illustration of another etched inductance board.

Reference is now directed to FIGS. 4 and 5, wherein actual etched inductance configurations are illustrated. More particularly, FIG. 4 shows a printed circuit board 58 constructed of conventional base materials having a layer of copper plating thereon and having four inductive elements 60, 62, 64 and 66 etched in the copper plating in the form of two interconnected pairs of elements formed of a continuous length of conductive material. Each of these etched inductors 60, 62, 64 and 66 is in the form of a rectangular spiral, and the paired elements 60, 62, and 64, 66 are mirror images of one another, as will be apparent from the figures. As stated hereinabove, each of inductors 24, 26 and 28 may have the configuration of inductive elements 60, 62, 64 and 66 of FIG. 4. In practice, it has been found convenient to use printed circuit boards such as 58 having only four inductors printed thereon in manufacturing the circuit of FIG. 2. In this case, inductors 24 and 26 of FIG. 2 are printed, while inductor 28, a conventional wire wound inductor, is soldered to the board 58 in the conventional manner. The inductors of FIG. 4 may be used in constructing filter circuits operable in the 54–82 MHz range, for example.

Similarly, FIG. 5 shows a printed circuit board 68 having seven inductors 70, 72, 74, 76, 78, 80, and 82 printed thereon, each of which is of rectangular spiral configuration. This board may be used in constructing a three stage filter equivalent to cascading the circuits of FIGS. 2 and 3. In this case, inductors 70, 72, 74 and 76 of FIG. 5 correspond to inductors 24 and 26 of FIG. 2, while inductors 78, 80, and 82 correspond to inductors 48 of FIG. 3. Again, inductor 28 of FIG. 2 may be of the conventional wire wound type, and may be soldered to board 68. It will be observed that inductors 70, 72, 74 and 76 of board 68 are essentially the same as inductors 60, 62, 64 and 66 of board 58, except for being smaller in size. This change in size is simply illustrative of the fact that the various inductors may be made in different sizes depending upon the frequency range in which the filter circuit is to be used. The smaller inductors of FIG. 5 may be used in constructing a filter operable in the 174–216 MHz range, for example.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bandpass filter circuit comprising:

input means, first capacitor means for matching the impedance of said bandpass filter circuit with that of an input circuit coupled in series with said input means, second capacitor means for trimming said bandpass filter coupled in series with said first capacitor means, third capacitor means for matching the impedance of coupled in series with said capacitor means, said bandpass filter circuit with that of an output circuit, output means coupled in series with said third capacitor means, first etched inductor means coupled to the juncture of said first and second capacitor means, second etched inductor means identical to said first inductor means coupled to the juncture of said second and third capacitor means and to said first etched inductor means; and third inductor means coupled to the juncture of said first and second inductor means.

2. A bandpass filter circuit as in claim 1, wherein said second capacitor means comprises a variable capacitor and said third inductor means comprises an etched inductor.

3. A bandpass filter circuit as in claim 1, wherein said second capacitor means comprises a fixed capacitor and said third inductor means comprises a variable inductor.

4. A bandpass filter circuit comprising:

input means, first capacitor means coupled to said input means, second capacitor means coupled to said first capacitor means, third capacitor means coupled to said second capacitor means, output means coupled to said third capacitor means, first etched inductor means coupled to the juncture of said first and second capacitor means, second etched inductor means coupled to the juncture of said second and third capacitor means and to said first etched inductor means, and, third inductor means coupled to the juncture of said first and second inductor means, a short length of non-resonant, low-impedance coaxial cable coupled to said output means, and, second bandpass filter means coupled to said coaxial cable.

5. A bandpass filter circuit as in claim 4, wherein said second bandpass filter means comprises:

first, second, and third capacitors connected in series, first inductor connected between first and second capacitors, second inductor coupled between said second and third capacitors, and, third inductor coupled between said first and second inductor means.

6. A bandpass filter circuit as in claim 5, wherein:

said first and second inductors are etched inductors.

7. A bandpass filter circuit as in claim 6, wherein:

said etched inductors are of rectangular spiral configuration.

8. A bandpass filter circuit as in claim 6, wherein:

said second capacitor is a variable capacitor, and said third inductor is an etched inductor.

9. A bandpass filter circuit as in claim 6, wherein:

said second capacitor is a fixed capacitor and said third inductor is a variable inductor.

10. A bandpass filter circuit as in claim 6, further comprising:

third bandpass filter means coupled to said third capacitor of said second bandpass filter means.

11. A bandpass filter circuit as in claim 10, wherein said third filter stage means comprises:

first substage means, fixed capacitor means coupled to said first substage means, second substage means coupled to said first capacitor means, second fixed capacitor means coupled to said second substage means, and, third substage means coupled to said second fixed capacitor means.

12. A bandpass filter as in claim 11, wherein said first, second, and third substage means each comprise a variable capacitor connected in parallel to an etched inductor.

13. A bandpass filter circuit as in claim 4, further comprising:

first, second and third substage means coupled to said second bandpass filter means, each substage means comprising an etched inductor and a variable capacitor connected in parallel, first fixed capacitor means coupling said first substage means to said second substage means; and, second fixed capacitor means coupling said second substage means to said third substage means.

* * * * *